United States Patent [19]
Hofmann et al.

[11] 3,975,066
[45] Aug. 17, 1976

[54] JOURNAL BEARING

[75] Inventors: Heinrich Hofmann; Günter Markfelder, both of Schweinfurt, Germany

[73] Assignee: Kugelfischer Georg Schäfer & Co., Schweinfurt, Germany

[22] Filed: Aug. 27, 1975

[21] Appl. No.: 608,339

[30] Foreign Application Priority Data
Aug. 28, 1974   Germany............................ 2441121
Oct. 16, 1974   Germany............................ 2449194

[52] U.S. Cl. ............................... 308/201; 308/217
[51] Int. Cl.² ................................. F16C 33/38
[58] Field of Search ............... 308/202, 206, 207 R, 308/210, 212, 213, 214, 216, 217, 218, 196, 201

[56] References Cited
UNITED STATES PATENTS
3,649,094   3/1972   Russell ........................... 308/201
3,749,460   7/1973   Hogan ............................ 308/196

Primary Examiner—M. H. Wood, Jr.
Assistant Examiner—Gene A. Church
Attorney, Agent, or Firm—Karl F. Ross; Herbert Dubno

[57] ABSTRACT

A journal bearing comprises one or two sets of rotary bodies, i.e. rollers and/or balls, guided in a cage structure of resilient resinous material with two axially spaced annular flanges snap-fitted into respective grooves of triangular cross-section which are formed in an outer and/or an inner race. The cage structure may comprise a single annular cage with apertures receiving the rotary bodies, a pair of such cages, or two axially spaced crenelated rings. Upon engagement of the two flanges in their grooves, the cage structure, race or races and rotary bodies form a unitary assembly.

12 Claims, 8 Drawing Figures

JOURNAL BEARING

FIELD OF THE INVENTION

Our present invention relates to a radial or journal bearing of the type wherein one or two sets of rotary bodies such as rollers or balls, arrayed about an axis, are held at predetermined peripheral distances from one another by cage structure while rolling on a track formed by a peripheral surface of an annular race or, more frequently, by confronting peripheral surfaces of two coaxial races, namely an outer and an inner one. The term "cage structure", as herein used, encompasses both a single cage (which in turn could be subdivided into two axially spaced parts) or a pair of cages, depending on the presence of either one or two sets of rotary bodies. The rollers, if used as the rotary bodies of at least one set, may be cylindrical or frustoconical; the individual axes of rotation of the cylindrical, frustoconical, spherical or spheroidal bodies need not be parallel to the bearing axis on which the cage structure and the race or races are centered.

BACKGROUND OF THE INVENTION

The common journal bearings of this description are provided with peripheral ridges on their inner and/or outer races designed to hold the cage or cages in position within these races. If these ridges are made integral with the respective races, the latter must be axially split to facilitate assembly and their separate parts must then be bolted together. Alternatively, the ridges may be constituted by annular disks which are secured to the races after assembly. In either case the interfitting of the parts is rather laborious.

It has already been proposed, e.g. according to German Pat. No. 1,056,881, to form an outer race of a needle bearing with a peripheral groove on its needle-contacting inner surface, this groove being engaged by a radial projection on the needle cage whereby the cage is held in a fixed axial position relative to the bearing race. Systems of the same general type, with cage structures of synthetic resin having radially projecting lugs received in corresponding recesses of a peripheral race surface, have also been described in German published specification No. 2,108,562 and U.S. Pat. No. 3,649,094.

OBJECTS OF THE INVENTION

The general object of our present invention is to provide an improved journal-bearing construction of the above-discussed type whose parts can be easily interfitted to form a unitary and coherent assembly which can be conveniently handled without risk of disintegration, e.g. installation in a housing or emplacement on a shaft.

Another object is to provide a journal bearing of the character described, including an inner and an outer race, in which the interposed cage structure is sturdy enough to transmit the axial forces required for dislodging the entire assembly from its mounting if only one of the races is accessible to the external application of axial pressure.

SUMMARY OF THE INVENTION

In accordance with our present invention, a cage structure engaging an array of rotary bodies has a pair of axially opposite end faces peripherally bounded by radially projecting resilient formations which are snap-fitted into respective recesses of a pair of annular surface zones on a race or a pair of races forming a track for these bodies. In order to enable independent interengagement of the resilient formations with their respective recesses, these formations and recesses are carried on at least three interfitting coaxial race and cage members.

Thus, we may provide an integral (e.g. outer) annular race element whose body-contacting peripheral surface forms the two recessed zones; the cage structure then comprises two axially spaced cage members respectively carrying the coacting formations. On the other hand, a single unitary cage may be used where the two recesses are provided on an inner and an outer race, respectively.

Advantageously, pursuant to another feature of our invention, the peripheral recesses are continuous grooves and the coacting formations are continuous flanges, the end faces of the cage structure bounded by these flanges being then annularly grooved or undercut in the vicinity of the flanges to provide the necessary resiliency.

The positioning of the resilient formations at axially opposite ends of the cage structure insures that the track-forming portion of the race surface is not weakened by the recesses designed to receive these formations and that, therefore, each race can be designed as a relatively thin-walled shell.

BRIEF DESCRIPTION OF THE DRAWING

The above and other features of our invention will now be described in detail with reference to the accompanying drawing in which.

SPECIFIC DESCRIPTION

Figure 1:
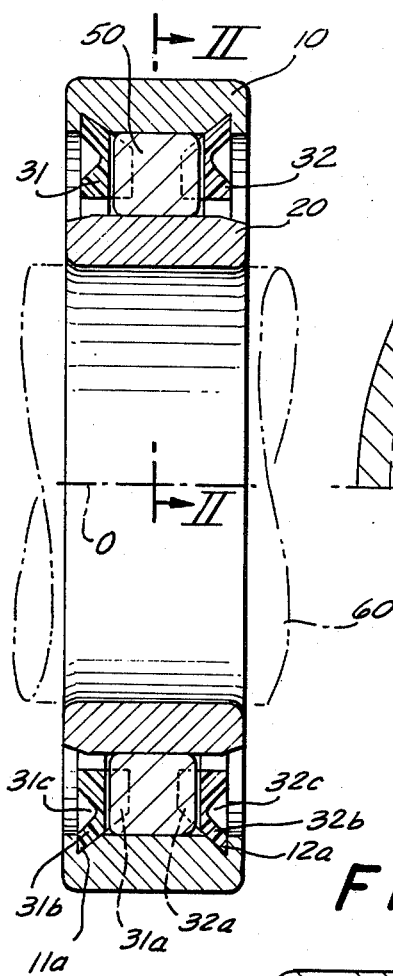
FIG. 1 is an axial sectional view of a journal bearing embodying our invention.
Figure 2:
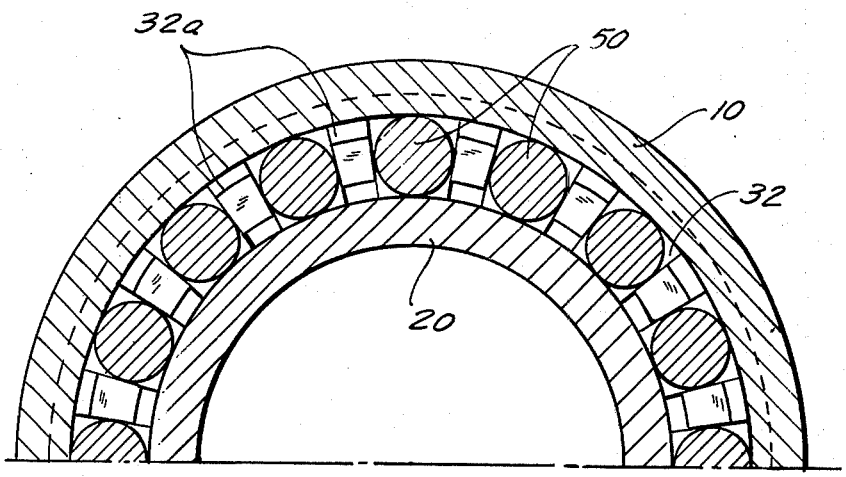
FIG. 2 is a cross-sectional view taken on the line II — II of FIG. 1.

In FIGS. 1 and 2 we have shown a journal bearing with an outer race 10, an inner race 20 and two axially spaced crenelated rings 31, 32 sandwiched therebetween, these rings forming part of a bearing cage engaging a set of rotary bodies 50 here shown as cylindrical rollers with axes parallel to the bearing axis 0. The two cage rings 31, 32 have confronting webs or teeth 31a, 32a which partially embrace the rollers 50 and form pockets or seats positively engaging them, the areas of contact between the teeth and the rollers extending past an imaginary cylinder surface defined by the roller axes. The axially opposite end faces of cage rings 31 and 32 are bounded by annular peripheral flanges 31b, 32b which fit into peripheral grooves 11a, 12a on the roller-contacting inner peripheral surface of outer race 10. The grooves are of triangular cross-section with steep flanks substantially in the planes of the end faces of the cage rings, these end faces being formed with annular grooves 31c, 32c constituting an undercut in the vicinity of each flange 11a, 12a to increase its resiliency. Thus, outer race 10, cage rings 31, 32 and rollers 50 can be readily assembled into a coherent unit by axially introducing the rings from opposite sides into the annular race 10 until their flanges 31b, 32b snap into the grooves 11a, 12a, even as their teeth 31a, 32a embrace the rollers 50. The unit thus assembled can then be easily mounted on the inner race 20 which in turn is press-fitted onto a shaft 60; if desired, the inner race 20 may be omitted in which case that unit is mounted directly on a larger-diameter portion of shaft 60.

The axial separation of the teeth 31a, 32a has the further advantage that a film of lubricant on the central portion of the roller bodies 50 is not stripped off by these teeth.

The arrangement shown in FIGS. 1 and 2 may be reversed by providing the grooves on the inner race 20 instead of the outer race 10. Such a reversal has been illustrated in FIG. 3 where, however, the rollers 50 have been replaced by balls 150 in engagement with suitably modified cage rings 131, 132. These cage rings have inner peripheral flanges 131b, 132b snap-fitted into respective grooves 21a, 22a on the outer peripheral surface of inner bearing race 20.

Figure 3:
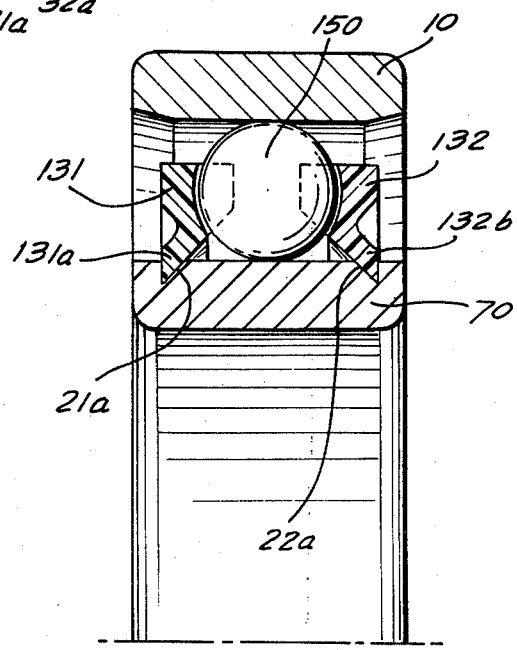
FIG. 3 is an axial sectional view showing half of a modified bearing according to our invention.
Figure 4:
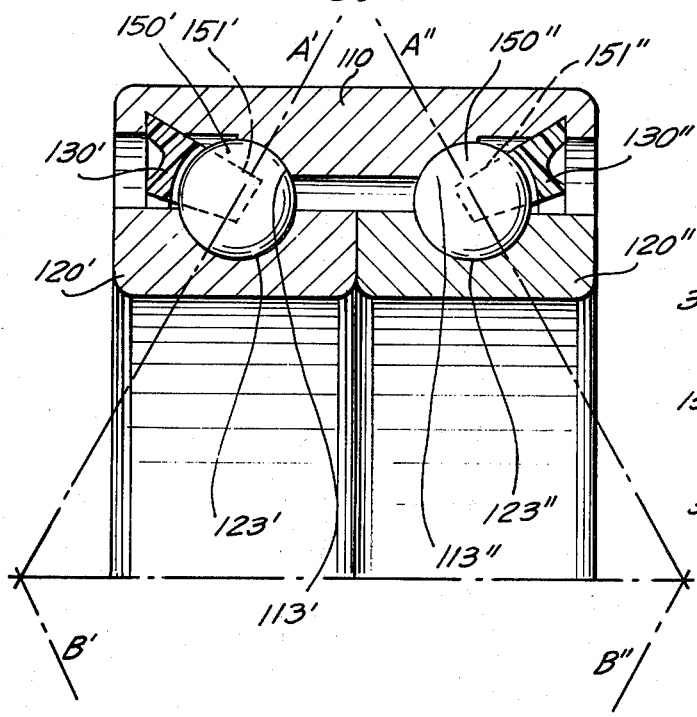
FIG. 4 is a view similar to FIG. 3, illustrating a bearing with two sets or rotary bodies.

FIG. 4 shows a journal bearing according to our invention with two sets of rotary bodies (here spheres) 150', 150'' held in position by respective cage members 130', 130'' in the form of crenelated rings generally similar to those of FIGS. 1 – 3. The inner race is split into two axially adjoining halves 120', 120'' whose outer peripheral surfaces are provided with arcuate grooves 123', 123'' forming deep channels for balls 150', 150'', respectively. These guide channels are aligned with respective shoulders 113', 113'' on the inner peripheral surface of an integral outer bearing race 110, the shoulders coacting with the rings 130', 130'' to hold the assembly together once the peripheral flanges of cage rings 130' and 130'' have snapped into the corresponding grooves of race 110. The peripheral continuity of these rings and their flanges allows the entire assembly to be stripped off its supporting shaft (not shown) by axial pressure on the outer race 110 if the inner race 120', 120'' is inaccessible to such pressure. Conversely, of course, axial pressure on the inner race may be used to dislodge the assembly from a surrounding housing.

Figure 5:
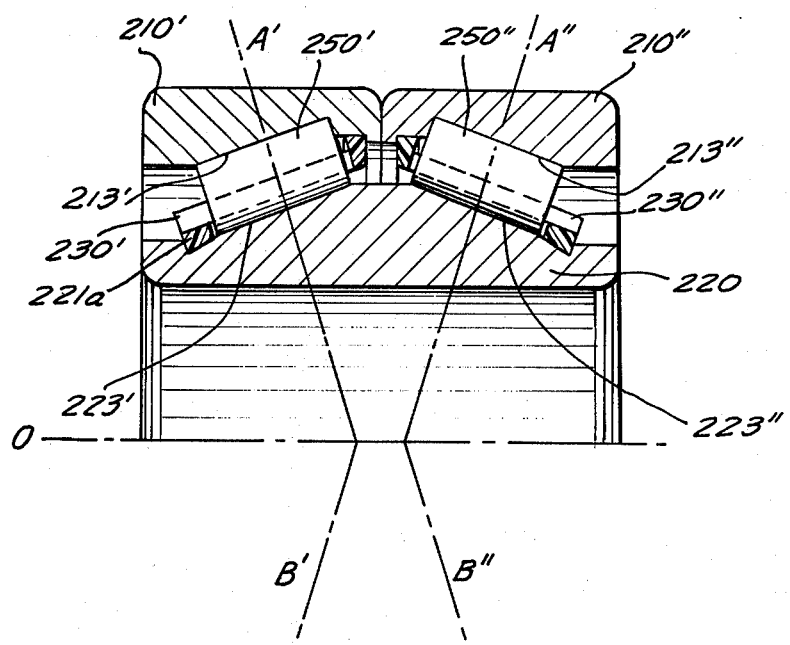
FIG. 5 is a view similar to FIG. 4, showing another modification.
Figure 6:
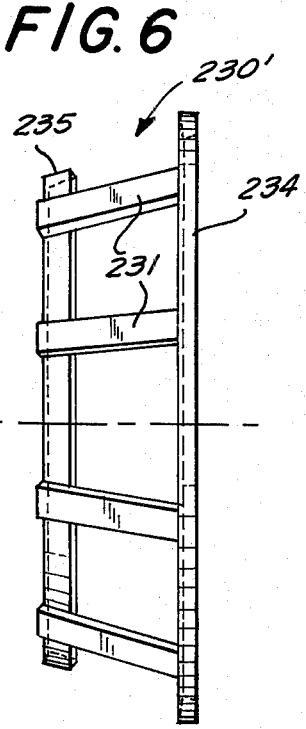
FIG. 6 is an elevational view of a cage forming part of the journal bearing of FIG. 5.

The balls of FIGS. 3 and 4 are also received with positive fit in their cage pockets, i.e. in the seats formed by the teeth of rings 131, 132 or 130', 130''. In FIG. 4 the seat axes for the illustrated upper balls 150', 150'' have been indicated at A', A'', these axes intersecting the corresponding axes B', B'' of the seats of the nonillustrated lower balls at points spaced along the bearing axis 0 by a distance greater than that between the centers of the two sets of balls. Because the four axes A', A'', B', B'' form an outline which resembles the letter 0, such an arrangement is sometimes referred to as an "0" (or bow-leg) mounting. In contradistinction thereto, we have shown in FIG. 5 a so-called "X" (or knock-knee) mounting where the upper seat axes A', A'' intersect the lower seat axes B', B'' at bearing axis 0 along points separated by a distance which is substantially less than the axial spacing of the centers of the two sets of rotary bodies. In FIG. 5 these bodies are represented by cylindrical rollers 250', 250'' partly received in guide channels 213', 213'' of two axially adjoining halves 210', 210'' of the split outer bearing race; the inner race 220 is here an integral element provided with sloping shoulders 223', 223'' which confront the guide channel 213', 213''. In this instance, furthermore, cage members 230' and 230'' completely surround the respective bodies 250' and 250'', seats for these bodies being formed by cutouts defined by webs 231 as illustrated in FIG. 6 for member 230'. The cutouts are bounded at one end by a larger ring 234 and at the other end by a smaller ring 235, the latter underlying the webs 231 and constituting an annular flange which snaps into a groove 221a of race 220. The other cage member 230'' is of symmetrical construction. It should be understood, though, that it is also possible to use rollers in one bearing half and balls in the other, with suitable modification of the cage receiving the balls. Naturally, the arrangement of FIG. 5 can also be inverted to have the cage flanges snap-fitted into grooves on an integral outer race element, as illustrated in FIG. 4; in that instance the flange would be part of ring 234 which would preferably overlie the webs 231.

Because of the interfitting of bodies 250' and 250'' with guide channels 213' and 213'', cages 230' and 230'' need not positively embrace these bodies and can therefore be designed relatively shallow.

Figure 8:
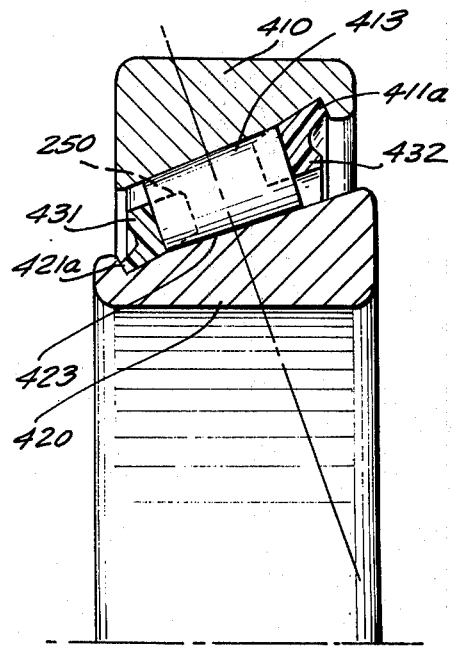
FIGS. 7 and 8 are other views similar to FIG. 3, illustrating two further modifications.
Figure 7:
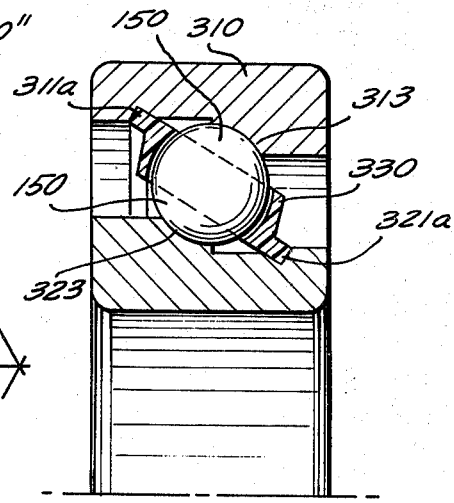

FIG. 7 shows another embodiment in which a single cage 330 positively engages a set of balls 150 seated in cutouts thereof and has opposite end flanges snap-fitted into a groove 311a of an integral outer race 310 and a groove 321a of an integral inner race 320. The balls also contact diametrically opposite annular shoulders 313 and 323 on the confronting peripheral surfaces of the two races. A generally similar arrangement is shown in FIG. 8 where two undercut rings 431, 432 of the type illustrated in FIGS. 1 – 4 positively engage a set of frustoconical rollers 250 contacting a pair of shoulders 413 and 423 of unitary outer and inner races 410 and 420. Two peripheral flanges of rings 431, 432 are snap-fitted into grooves 411a and 421a of races 410 and 420, respectively.

FIG. 8 also indicates that the two races need not necessarily be axially coextensive, as shown in the other Figures.

Naturally, features shown in the several embodiments may be substituted for one another combined within the limits of compatibility without departing from the spirit and scope of our invention as defined in the appended claims. Thus, for example, the unitary cage 330 of FIG. 7 could be replaced by a split cage as shown in FIG. 8, or vice versa.

We claim:

1. A journal bearing comprising:
    an array of rotary bodies centered on an axis;
    annular race means forming a track in contact with said bodies, said race means having two axially spaced annular surface zones coaxial with said array on opposite sides of said track, said zones being provided with respective recesses centered on said axis; and
    cage means engaging said bodies for maintaining same at predetermined peripheral distances from one another, said cage means having a pair of axially opposite end faces peripherally bounded by radially projecting resilient formations snap-fitted into said recesses, said cage means and race means together consisting of at least three interfitting coaxial members carrying said formations and recesses for enabling independent interengagement of said formations with said recesses to form a coherent unit with said bodies.

2. A journal bearing as defined in claim 1 wherein said cage means consists of resilient resinous material, said recesses being continuous annular grooves and said formations being continuous annular flanges matingly received in said grooves, said end faces being annularly undercut adjacent said flanges.

3. A journal bearing as defined in claim 2 wherein said grooves have a generally triangular cross-section diverging in a direction away from said track and ending in a steep flank.

4. A journal bearing as defined in claim 1 wherein said members include an outer race surrounding said cage means, said outer race having an inner peripheral surface in contact with said bodies and provided with at least one of said recesses.

5. A journal bearing as defined in claim 4 wherein said cage means comprises a pair of axially spaced cage members each carrying one of said formations.

6. A journal bearing as defined in claim 5 wherein said cage members are crenelated rings with confronting teeth partly bracketing said bodies.

7. A journal bearing as defined in claim 6 wherein said teeth form pockets receiving said bodies with positive fit.

8. A journal bearing as defined in claim 4 wherein said members further include an inner race provided with an outer peripheral surface in contact with said bodies.

9. A journal bearing as defined in claim 8 wherein one of said recesses is formed in said outer peripheral surface.

10. A journal bearing as defined in claim 8 wherein said inner race is split into two axially adjoining halves forming a pair of annular guide channels for said bodies, said array being divided into two axially spaced sets of bodies respectively cradled in said guide channels, said recesses being both formed in said inner peripheral surface.

11. A journal bearing as defined in claim 1 wherein said race means comprises an integral annular element with a peripheral surface contacting said bodies, said zones being part of said peripheral surface, said track including a pair of axially spaced annular shoulders on said peripheral surface respectively sloping toward said recesses, said array being divided into two axially spaced sets of bodies respectively resting against said shoulders, said cage means comprising a pair of axially spaced cage members respectively carrying said formations.

12. A journal bearing as defined in claim 11 wherein said race means further comprises a split annular element having two axially adjoining halves coaxial with said integral annular element, said halves forming a pair of annular guide channels respectively confronting said shoulders and receiving minor portions of the bodies of said sets.

* * * * *